May 3, 1966   M. D. KINGHORN   3,249,171
MOTORIZED KNOCK-DOWN GOLF CART
Filed June 15, 1964   2 Sheets-Sheet 1
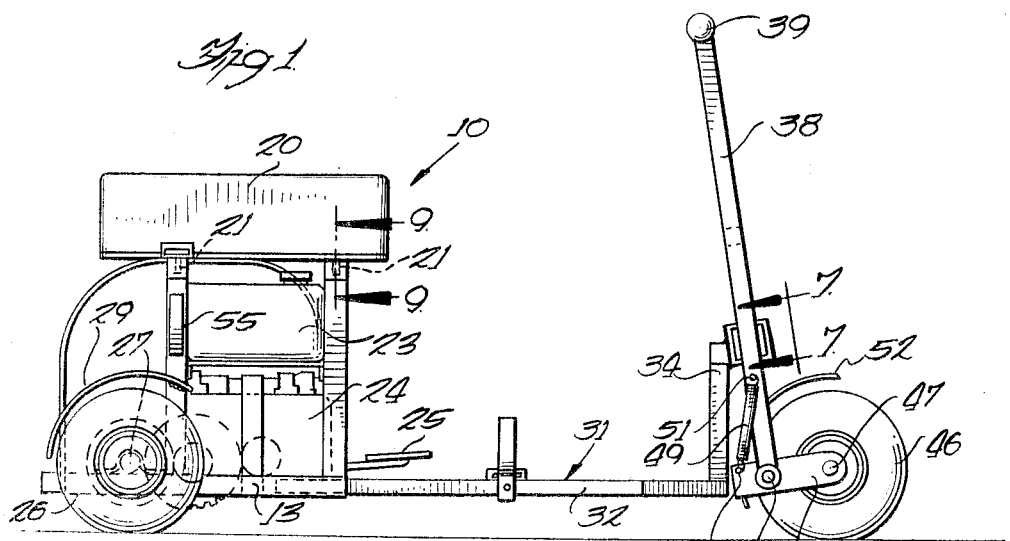
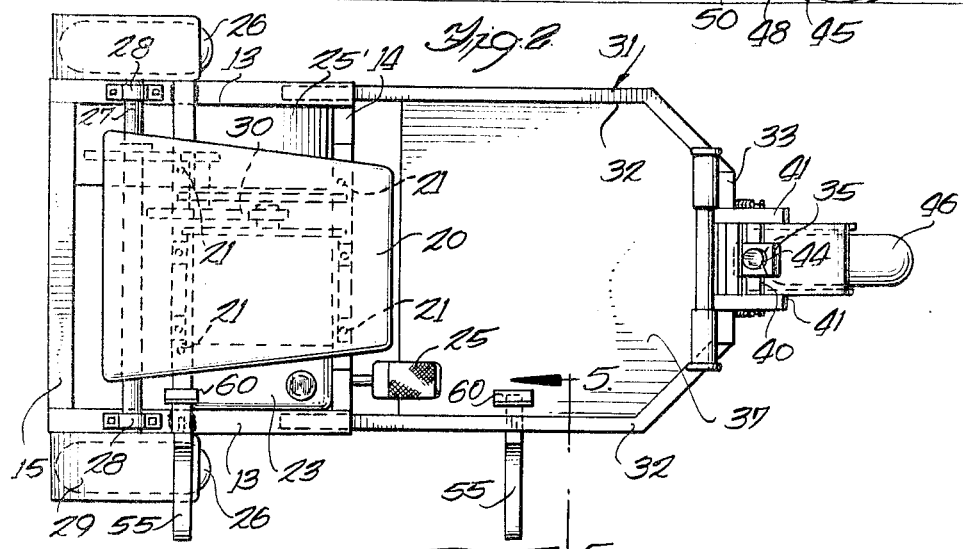
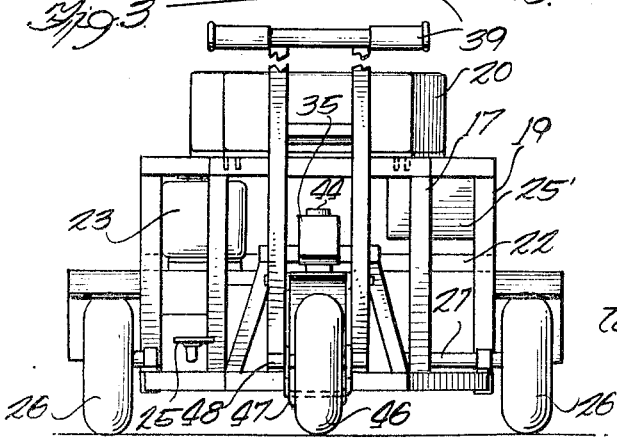
Inventor
Mark D. Kinghorn
Hilmond O. Vogel
Attorney May 3, 1966  M. D. KINGHORN  3,249,171
MOTORIZED KNOCK-DOWN GOLF CART
Filed June 15, 1964  2 Sheets-Sheet 2
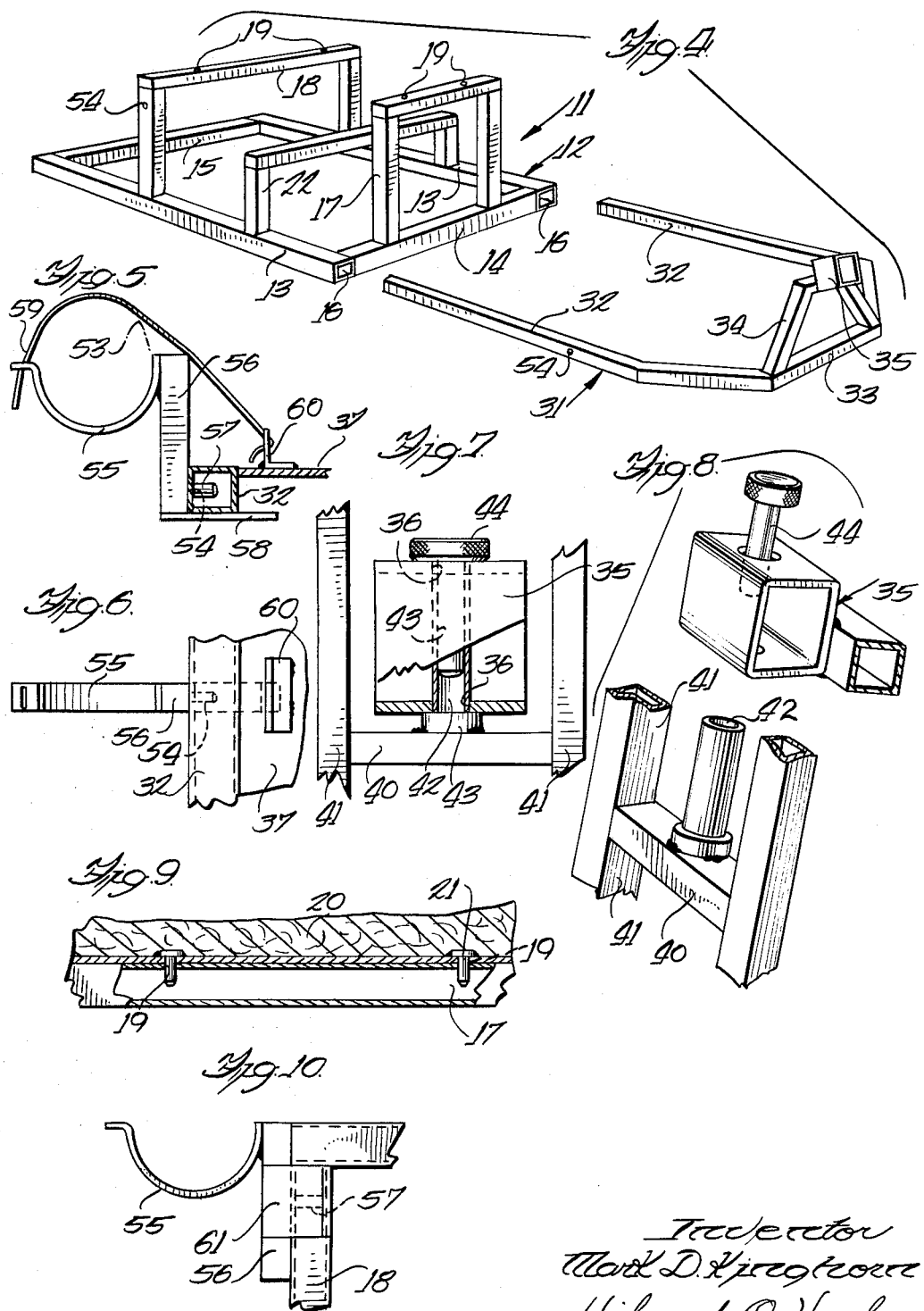
Inventor
Mark D. Kinghorn
Hilmond O. Vogel
Attorney

United States Patent Office 3,249,171
Patented May 3, 1966

3,249,171
MOTORIZED KNOCK-DOWN GOLF CART
Mark D. Kinghorn, 1333 Lincoln Highway,
Schererville, Ind.
Filed June 15, 1964, Ser. No. 374,909
5 Claims. (Cl. 180—27)

This invention relates to an improvement in a golf cart or vehicle. More specifically the invention relates to an improved golf cart which may readily be disassembled into several pieces for ease in transport.

A prime object of the invention is to provide an improved golf cart which may readily be disassembled into several individual components which may be easily stored for transport by means of another vehicle to and from a golf course.

Another object of the invention is to provide an improved inexpensive and easily assembled golf cart adapted to support golf equipment and the golfer for his round on a golf course.

A still further object is to provide an improved knock-down golf cart which may be readily assembled and disassembled without the utilization of tools so that the disassembled components can be easily stored in the trunk of an automobile.

A still further object is the provision of an improved one-man golf cart having bag carrying elements which cooperate with a frame and wheel structure which may be broken down into a number of components and which may then be readily reassembled when the golf cart has been transported to its destination for use.

These and other objects of the invention will become more readily apparent upon a reading of the description when examined in connection with the accompanying sheets of drawings.

In the drawings:

FIGURE 1 is a side elevational view of an improved one-man golf cart of the three-wheel type;

FIGURE 2 is a plan view of the golf cart shown in FIGURE 1;

FIGURE 3 is a front elevational view of the golf cart shown in FIGURES 1 and 2;

FIGURE 4 is a detailed perspective view of a frame showing the frame in a disassembled condition;

FIGURE 5 is a cross-sectional view taken substantially along the line 5—5 of FIGURE 2;

FIGURE 6 is a detailed view of an attaching bracket for supporting a golf bag on a golf cart;

FIGURE 7 is a cross-sectional view taken substantially along the line 7—7 of FIGURE 1;

FIGURE 8 is an exploded perspective view for attaching a front wheel assembly to a frame of an improved golf cart;

FIGURE 9 is a cross-sectional view taken substantially along the line 9—9 of FIGURE 1; and FIGURE 10 is a detailed view of a rear bracket for supporting a golf bag on an improved golf cart.

Referring now particularly to FIGURE 1 a golfer's vehicle or golf cart is generally designated by the reference character 10. The vehicle comprises a frame 11, which as best shown in FIGURE 4, comprises a rear frame section 12 consisting of a plurality of parallel tubular members 13 suitably connected by cross members 14 and 15. The tubular members 13 are provided at their forward ends with open end sockets 16. The cross member 14 supports an upright support 17 and the side members 13 support an upright support 18. The supports 17 and 18 include cross members which are each provided with openings 19 as shown in FIGURE 4. The frame section 12 is formed by metal members of tubular construction suitably welded together to provide a rigid structure. As best shown in FIGURE 1, a seat 20 is supported on the frame members 17 and 18 and as best shown in FIGURE 9, the seat is provided with suitable studs or dowel members 21 which extend through the openings 19 of the member 17. The rear of the seat 20 is similarly provided with studs 21 which extends into the openings 19 of the member 18 so that the seat is rigidly supported on the frame but may be easily removed by simply lifting the frame upwardly.

As best shown in FIGURE 4 an engine support is designated at 22 which also supports a gas tank 23 and an engine 24, as best shown in FIGURE 1 is suitably supported on the rear frame section 12 adjacent the engine support 22. As shown in FIGURE 1, a throttle control 25 is designated for actuating the engine. The engine may be of conventional construction and need not further be described. Drive wheels 26 are suitably supported by means of an axle 27 which in turn by means of bearing brackets 28 are supported on the frame members 13. Fenders 29 are suitably secured to the support member 18 and the drive wheels may be driven by suitable gearing 30 or the equivalent transmission mechanism such as belts, etc. The drive transmission forms no part of the present invention and merely includes the necessary drive elements and engine supported on the rear frame section 12.

As best shown in FIGURE 4 a forward frame section is designated at 31 and includes a pair of space tubular members 32 having end portions converging and being suitably welded to a transverse cross member 33. An upright bracket 34 is suitably welded to the cross member 33, the said bracket 34 supporting a journal bracket 35 as best shown in FIGURES 7 and 8. The journal bracket 35 is provided at its upper and lower ends with openings 36 as particularly shown in FIGURE 7. Referring now to FIGURE 2 it will be noted that a foot support or platform 37 is suitably supported and connected to the side members 32.

A pedestal or steering fork is designated at 38 and comprises a handle 39 as also best shown in FIGURE 3. Transverse brace 40 connects a pair of upright members 41 which form the pedestal or fork 38. The transverse brace 40 supports an upstanding tube or hollow journal member 42 which is secured to a boss 43 in turn welded to the transverse brace 40. The journal member 42 projects upwardly through the openings 36 of the journal bracket 35 and a pin 44 is disposed within the tubular journal member 42. Thus the vertical downward forces of the front frame 31 are supported on the cross member 40 and the bracket 35 freely journals on the hollow journal member 42.

A yoke or U-shaped bracket 45 suitably supports a front steering wheel 46 by means of an axle 47. The yoke 45 is pivotally connected by means of pivot pins 48 to each of the vertical or upright members 41. A pair of springs 49 is suitably connected to the yoke 45 as indicated at 50 and their other ends are suitably connected by means of pins 51 to the upright members 41. The springs thus serve to resiliently limit the movement of the yoke 45 relative to the fork 38 and thereby also provide a spring or cushioning action during operation of the vehicle. As best shown in FIGURE 2 the engine is suitably separated from the operator's seat by means of a cover 25'.

In FIGURES 5, 6 and 10 bag supports are disclosed and the outline of a bag is shown in broken lines in FIGURE 5 and designated at 53. Both front frame members 32 are suitably provided with openings 54, as shown in FIGURE 5, and support an arcuate bag holder bracket designated at 55, the said bracket 55 including a vertical part 56 which has a projecting pin 57, extending through the opening 54 and which includes a lower flat plate 58 that prevents turning movement of the part 56 relative to the frame member 32. A suitable flexible strap 59 is connected to the arcuate holder 55 and may extend over the bag 53 and may be suitably connected to an angle bracket 60 for securing one end of the bag on the vehicle. Since the frame member 32 on the left hand side also includes the opening the bag may be connected on the other side if desired by simply adding the additional clip 60 onto the platform 37. As best shown in FIGURE 10 the rear bag holder and support is substantially identical including the arcuate portion 55 and upright bracket 56. Instead of the bracket 58 however the bracket 61 is securely welded to the side of the bracket 56 and when the pin 57 is inserted through the opening 54 in the frame member 18 the plate 61 prevents the bracket 56 from rotating similarly to the function of the plate 58 with respect to the front bracket. The supporting member 18 also is provided with suitable holes on its other leg to permit the rear brackets to be placed on the other side of the vehicle. Similarly a strap 59 is utilized for supporting the bag securely with respect to the cart. When it is desired to disassemble the cart it is a simple matter to remove the pin 44 whereupon the bracket 35 is disengaged from the fork 38, wheel 46 and yoke 45, whereupon the fork, wheel and yoke are now a separable component. The bag 53 is removed by unloosening the straps 59 from the rear and front brackets 55 and now the front frame 31 can easily be disassembled as shown in FIGURE 4 thereby forming another component. For the purpose of clarity in FIGURE 4 the platform 37 is removed but the platform 37 is normally a part of the front frame structure 31. It can now be seen that the remaining component is the rear frame including the engine and other driving parts including the rear drive wheels. It is a simple matter also now to remove the seat 20 so that essentially now four (4) individual components are provided. It is quite obvious that these components may easily be stored in the trunk of a car and that it is a simple matter to reassemble them. The members 32 form a sliding fit within the socket 16 of the tubular members 13 and since the driving forces of the wheels 26 are in a forward direction these will be retained in a snug fit relation. Further the bag itself in its position on the holders 55 acts to keep the frame members 32 in engagement with the socket 16 of the members 13.

It is obvious that the cart now can quickly be assembled or disassembled as desired without any necessity of utilizing tools of any kind. Thus the cart is a completely collapsible or knock-down cart in the sense that individual components are readily assembled and disassembled as required. By virtue of the simplicity of the structure, strength, durability and storability are provided.

It is now apparent that the objects of the invention have been fully achieved and that an improved knock-down golf cart has been disclosed. It must be realized that changes and modifications may be made without departing from the spirit of the invention as disclosed and as claimed in the appended claims.

I claim:
1. In a knock-down vehicle comprising;
   (a) a supporting frame including first and second disengageable frame sections;
   (b) said first section including at least one vertically extending seat support;
   (c) a seat removably secured to said support;
   (d) drive wheels connected to said first section;
   (e) means supporting a power unit on said first section for driving said wheels;
   (f) said first section having a pair of parallel frame members including horizontally extending sockets positioned on laterally opposite sides of said frame;
   (g) said second frame section having a pair of substantially parallel frame members including portions thereof removably engaging said sockets in telescoping relation;
   (h) a vertical fork support on said second frame section including forwardly extending horizontal bracket means;
   (i) a fork comprising a pair of transversely spaced upright members including a transversely extending brace connected thereto;
   (j) said bracket means including vertically spaced aligned openings;
   (k) a vertical journal member on said brace extending through said openings and being removably connected to said fork;
   (l) an axle structure including a wheel and axle rotatably connected to one end of said structure;
   (m) a spring pivotally connected to the other end of said structure and to said fork;
   (n) means pivotally connecting said upright members to said structure on opposite sides of said wheel;
   (o) and handle means on said fork;
   (p) said fork with said wheel and axle being removable from said second section, said second section being removable from said first section and said seat being removable from said first section to provide for knock down transport of said vehicle.

2. In a knock-down vehicle comprising;
   (a) a supporting frame including first and second disengageable frame sections;
   (b) said first section including,
   (c) an operator's seat
   (d) drive wheels connected to said first section;
   (e) means supporting a power unit on said first section for driving said wheels;
   (f) said first section having a pair of parallel frame members including horizontally extending sockets positioned on laterally opposite sides of said frame;
   (g) said second frame section having a pair of substantially parallel frame members including portions thereof removably engaging said sockets in telescoping relation;
   (h) a vertical fork support on said second frame section including forwardly extending horizontal bracket means;
   (i) a fork comprising a pair of transversely spaced upright members including a transversely extending brace connected thereto;
   (j) said bracket means including vertically spaced aligned openings;
   (k) a vertical journal member on said brace extending through said openings and being removably connected to said fork;
   (l) an axle structure including a wheel and axle rotatably connected to one end of said structure;
   (m) a spring pivotally connected to the other end of said structure and to said fork;
   (n) means pivotally connecting said upright members to said structure on opposite sides of said wheel;
   (o) and handle means on said fork;
   (p) said fork with said wheel and axle being removable from said second section, said second section being removable from said first section to provide for knock down transport of said vehicle.

3. In a knock-down vehicle comprising;
   (a) a supporting frame including first and second frame sections;
   (b) said first section including ground engaging wheel means, an engine for driving said wheels and an operator's seat;
   (c) said first section including forwardly opening transversely spaced socket portions;
   (d) said second frame section including transversely spaced rearwardly extending projecting members engaging said sockets in telescoping relation so as to be readily disengageable therewith;

(e) a pedestal support on said second frame including bracket means, a pedestal comprising a pair of transversely spaced upright members including a transversely extending brace connected thereto, said bracket means including substantially vertically extending aperture means, a substantially vertical hollow journal member having one end rigid with the brace, said journal member extending in said aperture means and having removable means in its other end, and a steerable ground engaging wheel means rotatably mounted on said pedestal;

(f) whereby said first and second frame sections, and said pedestal are removable as individual units in knock-down relation to provide for ready transport of said vehicle.

4. A vehicle in accordance with claim 3 including a pair of removable bag-carrier brackets removably attached to said frame and adapted to removably support a golf rack and the like.

5. A vehicle in accordance with claim 4, said frame including bracket receiving means on opposite sides of said frame, whereby said carrier brackets may be removably secured on opposite sides of said frame.

References Cited by the Examiner

UNITED STATES PATENTS

| | | | |
|---|---|---|---|
| 1,333,449 | 3/1920 | Russell | 280—285 |
| 2,499,654 | 3/1950 | Kuhlman | 224—42.45 |
| 2,594,034 | 4/1952 | King | 280—287 X |
| 2,680,544 | 6/1954 | Hunt et al. | 224—42.45 |
| 2,696,272 | 12/1954 | Schlaphoff | 280—278 X |
| 2,966,951 | 1/1961 | Lang | 180—25 |
| 2,973,048 | 2/1961 | Jensen | 180—27 |
| 3,043,389 | 7/1962 | Steinberg | 180—27 |
| 3,079,172 | 2/1963 | Burwell | 280—278 |
| 3,177,963 | 4/1965 | Mitchell | 180—27 |

FOREIGN PATENTS 644,999  6/1928  France.

KENNETH H. BETTS, *Primary Examiner.*